United States Patent [19]
Tetreault et al.

[11] 3,753,103
[45] Aug. 14, 1973

[54] ELECTRICAL CIRCUIT TEST PROBE HAVING SPRING BIASED PROBE ASSEMBLY

[75] Inventors: Paul J. Tetreault, Seekonk; Douglas R. Gobin, Attleboro, both of Mass.

[73] Assignee: Crystal-Protronics Associates, Pawtucket, R.I.

[22] Filed: Nov. 17, 1971

[21] Appl. No.: 199,707

[52] U.S. Cl. ........................ 324/72.5, 339/108 TP
[51] Int. Cl. ............................................. G01r 31/02
[58] Field of Search ...................... 324/72.5, 158 P, 324/149; 339/108 TP

[56] References Cited
UNITED STATES PATENTS
3,559,056  1/1971  Easi .................................. 324/72.5
3,562,643  2/1971  Smith ................................ 324/72.5
3,596,177  7/1971  Butera .............................. 324/72.5

Primary Examiner—Robert J. Corcoran
Attorney—Elliot A. Salter and Leonard Michaelson

[57] ABSTRACT

A device for testing electrical circuits including an elongated hollow barrel having a probe assembly mounted for axial movement in an end thereof, the probe assembly being urged outwardly of the barrel by a compression spring located therein, and further including inner and outer plungers that are interconnected by a leaf spring that provides for firm engagement of the inner plunger with the wall of the barrel, wherein a proper electrical circuit is established from the probe assembly through the barrel.

5 Claims, 4 Drawing Figures

PATENTED AUG 14 1973     3,753,103

ELECTRICAL CIRCUIT TEST PROBE HAVING SPRING BIASED PROBE ASSEMBLY

BACKGROUND OF THE INVENTION

The present invention has particular application in the testing of printed circuit boards, integrated circuits and various other kinds of electronic circuits.

Prior to the instant invention, a plunger type electrical contact or test probe has been used for the testing of multiple contacts in circuits and usually these test probes have consisted of a barrel in which a probe unit was mounted for axial movement, a spring of the compression type being located within the barrel and normally urging the probe outwardly therefrom.

Although these prior known devices for use in the testing of electrical circuits were satisfactory for the most part, they sometimes did not give consistent results because of poor electrical contact within the device, which increased the resistance in the test circuit, thereby causing the inconsistent results to be obtained. Further, these prior known test probes included incidental details that were considered to be necessary in the construction thereof, but only added to the overall cost of the test unit.

SUMMARY OF THE INVENTION

The test probe device for testing electrical circuits as embodied in the present invention includes an elongated hollow barrel in one end of which a fixed terminal is secured. A probe assembly is mounted for axial movement in the other end of the barrel, and a spring is interposed between the fixed terminal and the probe assembly and normally urges the probe assembly outwardly of the barrel. One of the unique features of the subject invention is in the use of a leaf spring that interconnects an inner and outer plunger that are formed as part of the probe assembly. The leaf spring is constructed such that when an axial force is exerted thereon by the outer plunger, upon engagement with a test contact, a component of force is created that urges the inner plunger in a direction that is offset with respect to the axis thereof, thereby forcing the inner plunger into intimate engagement with the inner wall of the barrel. Since the wall of the barrel is used as an electrical conductor to transmit current between the outwardly extending probe joined to the outer plunger and the fixed terminal, firm engagement of the inner plunger with the barrel insures that a proper electrical circuit will be maintained from the test contact to the fixed terminal.

Accordingly, it is an object of the present invention to provide a device for testing of electrical circuits that includes a barrel having a probe assembly disposed therein that includes an inner plunger, an outer plunger spaced from the inner plunger, and resilient means interconnecting the inner and outer plungers.

Another object of the invention is to provide a device for testing electrical circuits that includes a probe assembly mounted for axial movement in a hollow barrel, the probe assembly including a leaf spring that interconnects an inner and outer plunger, the leaf spring being adapted to exert a component of force against the inner plunger to force the inner plunger into intimate engagement with the inner wall of the barrel.

Still another object is to provide a probe assembly for use in a device for testing electrical circuits, wherein a leaf spring is interposed between an inner and outer plunger, the leaf spring being operative to insure proper electrical communication through the barrel of the test device when the test device is located in engagement with a contact of a circuit being tested.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
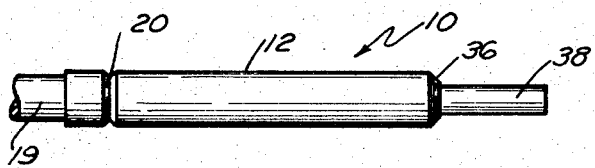
FIG. 1 is an elevational view of the device for testing electrical circuits as embodied in the subject invention.

Referring now to the drawing and particularly to FIG. 1, the test device as embodied herein is illustrated and is generally indicated at 10. As presently contemplated, the test device 10 has particular application in the testing of electronic circuitry, such as printed circuit boards, integrated circuits, terminal boards and other circuits that have a plurality of contact points in the design thereof. It is understood that the test device as illustrated and described herein may be incorporated in a multiple system, wherein a plurality of such testing devices or probes are utilized in a single unit to simultaneously test or check a plurality of circuits.

Figure 2:
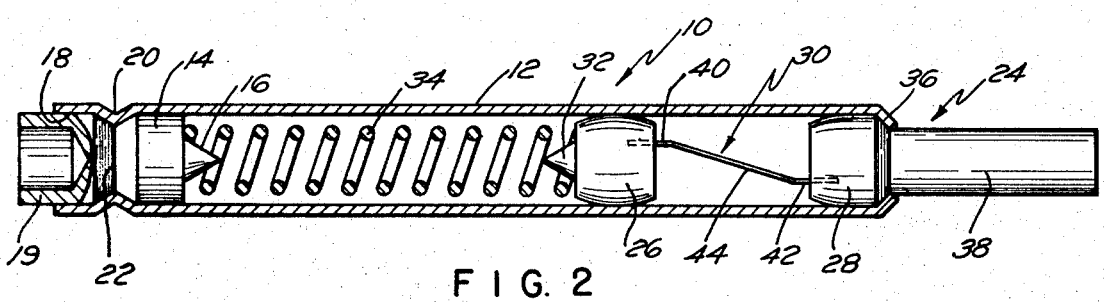
FIG. 2 is a sectional view of the device as illustrated in FIG. 1.
Figure 3:
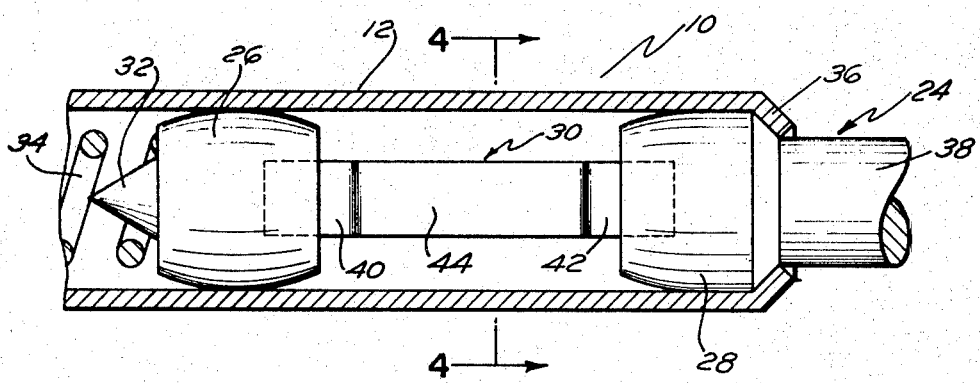
FIG. 3 is an enlarged sectional view of the device rotated 90° with respect to FIG. 2 and showing the location of the leaf spring that interconnects the spaced plungers of the probe assembly.
Figure 4:
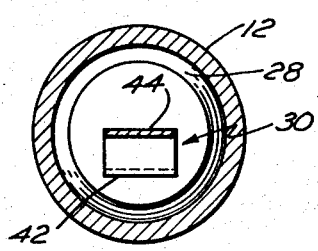
FIG. 4 is a sectional view taken along line 4—4 in FIG. 3.

Referring now to FIGS. 2, 3 and 4, the test probe 10 includes an elongated tubular barrel 12 that is preferably formed of a base material such as brass and is coated interiorly with a heavy gold plating to insure high conductivity with low resistance in use of the device, and to further insure proper electrical contact when the device is used after a period of nonuse. Secured to the rearmost end of the barrel 12 is a fixed terminal 14, the inner end of which is formed with a cone element 16 and the outer end of which is provided with a socket 18 for receiving a hollow contact 19 that is soldered therein. The contact 19 receives a wire lead therein that may be secured by soldering or the like. The rearmost end of the barrel 12 is crimped as indicated at 20 to positively fix the terminal 14 within the barrel. For this purpose, the terminal 14 is provided with a grooved portion 22 which receives the crimped portion 20 of the barrel therein, thereby providing for positively fixing the terminal 14 to the barrel 12.

Mounted for axial movement in the forward end of the barrel 12 is a probe assembly generally indicated at 24, the probe assembly including an inner plunger 26, an outer plunger 28 and a leaf spring generally indicated at 30. The inner plunger 26 is formed with a rearwardly directed cone section 32 that cooperates with the cone section 16 of the terminal 14 to retain a compression spring 34 therebetween. It is seen that the compression spring 34 normally urges the probe assembly 24 in an outer direction, the limit of movement of the probe assembly 24 being defined by a peened outer edge 36 with which the outer plunger 28 makes contact in the forwardmost position thereof.

Joined to the outer plunger 28 and extending outwardly of the tubular barrel 12 is a probe contact 38 that is utilized to contact a test point of a circuit being tested. It is seen that the test probe 38, plunger 28, leaf spring 30 and inner plunger 26 are all interconnected and are movable in an axial direction as a unit against the action of the compression spring 34 when pressure is exerted on the test probe 38 in use of the device. The plungers 26 and 28 and the leaf spring 30 are also entirely enclosed within the barrel 12, which insures proper movement of the plungers with the barrel as a guide therefor.

It is essential in the testing of an electrical circuit by the test device 10 that a low resistance circuit be completed from the test probe 38 that engages the test point in the circuit, to the contact 19. For this purpose, the barrel 12 is designed to carry current, rather than the compression spring 34, particularly since the path through the barrel 12 is the lowest resistance route and will provide for more consistant results in the use of the device. In order to obtain positive electrical contact from the test probe 38 through the barrel 12, the leaf spring 30 is provided and insures that upon an axial movement of the probe assembly 24 a component of force is produced that causes the inner plunger 26 to be deflected into positive engagement with the inner wall of the barrel 12. As shown in FIG. 3, the lateral dimension of the leaf spring 30 is considerably less than the diameter of the barrel 12. This insures sufficient flexing movement of the leaf spring 30 to produce the component of force required. Further, as illustrated in FIG. 2, the leaf spring 30 is formed with an inner end portion 40 that is secured in a slot formed in the inner plunger 26, an outer end portion 42 that is secured in a slot formed in the outer plunger 28, and an intermediate portion 44 joined to the end portions 40 and 42 that is inclined to the horizontal. With the leaf spring 30 constructed as illustrated in FIG. 2, an axial force directed inwardly against the leaf spring by the test probe 38 and plunger 28 will cause the leaf spring 30 to produce a component of force on the inner plunger 26 that will direct the inner plunger into firm and positive engagement with the inner wall of the barrel 12. The leaf spring 30 is preferably formed of a beryllium copper alloy that acts as a conductor and will further insure that a low resistant current path will be established from the test probe 38 through the barrel 12 and to the lead 19. As previously described, the inner surface of the barrel 12 is coated with gold plating that also insures good electrical conductivity through the barrel.

In use of the device, the test probe 38 is placed in contact with a point in the circuit to be tested and a downward force is exerted on the barrel 12. The compression spring 34 compensates for the downward force thereby providing for an inward axial movement of the probe assembly 24. A circuit is established through the test probe 38, outer plunger 28, leaf spring 30, inner plunger 26 and barrel 12 to the contact 19.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described.

We claim:

1. A device for testing electrical circuits, comprising an elongated hollow barrel, in one end of which a fixed terminal is secured, a probe assembly mounted for axial movement in the other end of said barrel, and a spring interposed between said fixed terminal and probe assembly and normally urging said probe assembly outwardly of the barrel, said probe assembly including a first plunger located interiorly of said barrel, a second plunger located interiorly of said barrel and spaced from said first plunger and resilient means interconnecting said plungers for urging said first plunger into positive electrical communication with the inner wall of said barrel, said resilient means including a leaf spring, the ends of which are fixed to said plungers and movable therewith against the action of the first named spring, said leaf spring having a central portion joined by end portions, said end portions being fixed to said plungers on opposite sides of the axis of said barrel and said central portion being inclined with respect to the axis of the barrel and intersecting said axis for locating said end portions in spaced, parallel planes, wherein any inner directed force on said second plunger is translated into a lateral component of force on said first plunger by said leaf spring, thereby forcing said first plunger into positive contact with the inner wall of said barrel.

2. A device as set forth in claim 1, the oppositely facing ends of said first and second plungers having slits formed therein for receiving the end portions of said leaf spring therein, whereby said leaf spring is firmly anchored to said plungers and is movable therewith.

3. A device for testing electrical circuits, comprising an elongated hollow barrel, in one end of which a fixed terminal is secured, a probe assembly mounted for axial movement in the other end of said barrel, and a spring interposed between said fixed terminal and probe assembly and normally urging said probe assembly outwardly, longitudinally of the barrel, said probe assembly including a first plunger located interiorly of said barrel intermediate the ends thereof, a second plunger located interiorly of said barrel adjacent to the other end thereof and longitudinally spaced from said first plunger, said second plunger including a probe contact that extends outwardly of the other end of said barrel and that defines a probe terminal for engaging a contact in the electrical circuit to be tested, and resilient means located within said barrel between said plungers and having opposed end portions interconnected thereto at least one end portion being displaced from the axis of said barrel, said resilient means being generally inclined to the axis of said barrel and urging said first plunger into positive electrical communication with the inner wall of said barrel upon engagement of said probe terminal with a contact, said barrel defining a guide for the longitudinal movement of said probe assembly.

4. A device as set forth in claim 3, said resilient means including a leaf spring, the ends of which are fixed to said plungers and movable therewith against the action of said first named spring.

5. A device as set forth in claim 4, the lateral dimension of said leaf spring being relatively reduced with respect to the diameter of said barrel.

* * * * *